United States Patent [19]

Seligman et al.

[11] 4,425,625

[45] Jan. 10, 1984

[54] DIAGNOSTIC DISPLAY TERMINAL SYSTEM

[75] Inventors: Lawrence Seligman, Sherborn; Ralph A. Perron, Northbridge, both of Mass.

[73] Assignee: Data General Corporation, Westboro, Mass.

[21] Appl. No.: 47,751

[22] Filed: Jun. 12, 1979

[51] Int. Cl.³ .............................................. G06F 3/00
[52] U.S. Cl. .................................................... 364/900
[58] Field of Search ... 364/200 MS File, 900 MS File, 364/120; 371/16, 17; 179/2 DP, 2 AS, 2 TV; 358/85, 903, 84

[56] References Cited

U.S. PATENT DOCUMENTS

| | | | |
|---|---|---|---|
| 3,882,305 | 5/1975 | Johnstone | 364/200 X |
| 3,889,062 | 6/1975 | Epstein | 371/17 X |
| 3,932,709 | 1/1976 | Hoff et al. | 179/2 DP X |
| 4,109,309 | 8/1978 | Johnstone et al. | 364/120 |
| 4,225,918 | 9/1980 | Beadle et al. | 364/200 |

OTHER PUBLICATIONS

"Dasher D3-D4-D5 Video Display Terminals", Data General Corp., 1969.

*Primary Examiner*—Thomas M. Heckler
*Attorney, Agent, or Firm*—Jacob Frank; Joel Wall; Irving M. Kriegsman

[57] ABSTRACT

A diagnostic display terminal system for remotely troubleshooting hardware, software and operational malfunctions in a computer over telephone lines includes a user-site diagnostic display terminal assembly and a support-site diagnostic display terminal assembly. Each diagnostic display terminal assembly includes a microprocessor controlled display terminal, a telephone instrument and a split baud rate modem, the modem serving to interface the display terminal and the telephone instrument to a telephone line. The system provides alternate voice and data communication between the user-site and the support-site and permits almost instantaneous change-over between voice and data. The telephone link effectively merges the two display terminals together in that each display terminal can monitor the actions of the other and that each display terminal can run all programs executable at the user-site display terminal. When not being used for diagnostic purposes, the display terminal at the user-site functions as a conventional display terminal.

1 Claim, 1 Drawing Figure

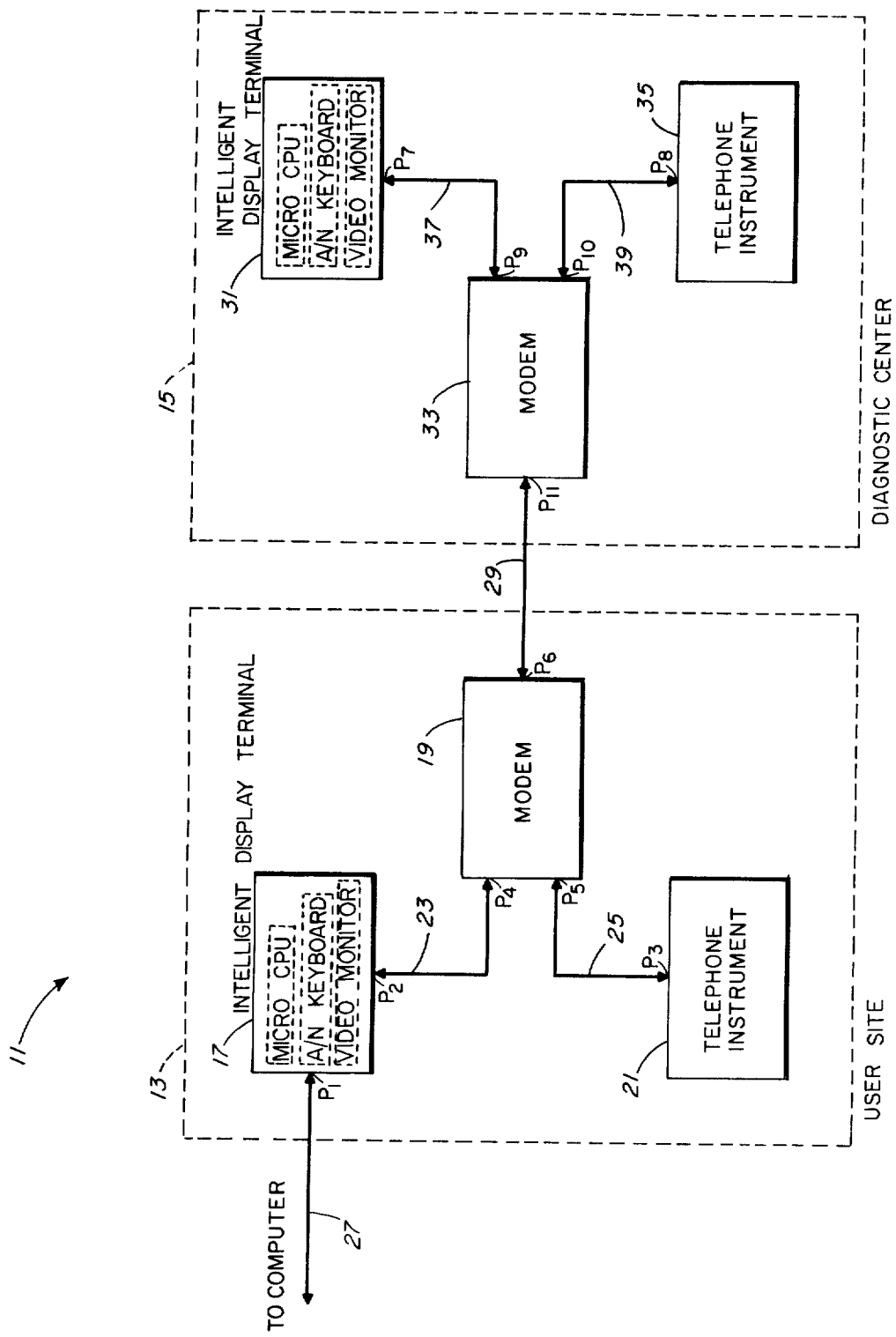

DIAGNOSTIC DISPLAY TERMINAL SYSTEM

BACKGROUND OF THE INVENTION

This invention relates to a system for remote diagnosis of software, hardware and operational malfunctions in a computer over telephone lines and more particularly to a system which accomplishes such diagnosis by transmitting voice and data information between a computer user and a diagnostic support center over telephone lines.

It is not uncommon for computer systems users to experience hardware, software or operational problems in the day-to-day use of their equipment. In some instances the problems are such that they can be diagnosed and corrected on site by the user of the equipment; however, in most cases the user or operator of the equipment does not possess the technical skills necessary to properly troubleshoot and/or correct the fault. When this occurs it is generally necessary to obtain outside assistance from a technically skilled person at a support center, which is generally, but not always, the supplier of the equipment.

In the past, attempts have been made to troubleshoot and correct such malfunctions by simply calling the support center over a telephone and describing what appears to be the problem. This technique has not proven to be very successful, mainly because of the inability of the operator or user to accurately and completely describe the problem and/or what he is observing on his display terminal.

Another technique that has been employed in the past has involved sending voice and data information from the user to the support center over telephone lines using acoustic couplers to transmit the data from the terminal into the telephone line. Unfortunately this technique has also not proven to be entirely satisfactory. One of the problems with this technique is that it has only been possible to send data from the user to the support center at baud rates of about 300, which is relatively slow. Another problem with this technique is that in order to send the data the telephone instrument must be physically placed inside the acoustic coupler. When voice communications with the support center is desired or needed the telephone instrument must be phusically removed from the acoustic coupler. Consequently it is not possible to provide a continual and rapid change over between voice to data communication.

As a result, the technique that has been most frequently employed to diagnose and correct problems has been to send a technician from the support center to the user-site. Some of the disadvantages in this approach are that it is time consuming, often very expensive and not practical in the case of minor problems. In addition, at many times it has been difficult, after a time period has elapsed, to recreate the specific problem or the same conditions that caused the problem.

Accordingly, the need exists for a new and improved technique for diagnosing and, if possible, correcting hardware, software and operational faults occuring at a user-site during the day-to-day use of his equipment.

SUMMARY OF THE INVENTION

According to the teachings of this invention there is provided a diagnostic display terminal system which permits troubleshooting of hardware, software and operational faults from a remote location over a two wire telephone line in an extremely efficient and relatively economical manner.

The diagnostic display terminal system features two diagnostic display terminal assemblies, one for use at the user-site and the other for use at the support site. Each diagnostic display terminal assembly includes an intelligent display terminal, a telephone instrument and a split baud rate modem, the modem interfacing the intelligent display terminal and telephone instrument to a two wire telephone line. The modem connected to the intelligent display terminal at the user-site is designed to transmit data at a high baud rate and receive data at a low baud rate while the modem connected to the intelligent terminal at the support-site is designed to receive data at a high baud rate and transmit data at a low baud rate.

During normal operation the display terminal at the user-site and the display terminal at the support-site function and may be used as ordinary display terminals. When a problem occurs the user simply dials the support center on the telephone instrument, establishing thereby voice and data communication with the support center. Once connected, the two assemblies are effectively merged into a single display terminal in that each can monitor the other's action and that each can operate all programs executable at the user-site terminal. Furthermore, personnel at the support-site can monitor the information displayed at the user-site terminal, whether it be the execution of diagnostics, the execution of applications programs or installing software change. Change-over between voice and data communication is handled by the intelligence in the display terminals. The communication link can be broken, if desired, at any time at either end by simply hanging up the telephone.

Since the technician at the support center can view what is appearing on the monitor at the user-site as well as his own monitor and converse with the user the need to travel to the user-site to diagnose and/or solve problems is substantially reduced. Since errors can be diagnosed at the time they occur the need for recreating errors at a later time is reduced. Furthermore, since the system does not involve the use of acoustic couplers and includes split baud rate modems, data can be transmitted from the user site to the support site at a baud rate making such a system practical for troubleshooting problems. Also, since the system does not involve physically inserting a telephone instrument into an acoustic coupler, the time elapsed in changing between voice and data communication is greatly reduced. In addition, the technique permits using a headset type telephone instrument as opposed to a handset type telephone instrument. This renders the system still more efficient and practical since the operator at each end can use both of his hands as all time, once the communication link is established, to operate the display terminal keyboard.

BRIEF DESCRIPTION OF THE DRAWINGS

Further features and advantages of the invention will become more readily apparent from the following detailed description of a specific embodiment of the invention when taken in conjunction with the accompanying drawings.

In the drawings the sole FIGURE is a block diagram illustrating the preferred embodiment of the invention.

DESCRIPTION OF PREFERRED EMBODIMENT

Referring now to the drawings there is illustrated a system employing the teachings of this invention for remote diagnosis of software, hardware and operational malfunctions in a computer, the system identified generally by reference numberal 11.

System 11 includes a user-site diagnostic display terminal assembly 13 which is intended for use at the user-site, and a support-site diagnostic display terminal assembly 15 which is intended for use at the support site or diagnostic center.

User-site diagnostic display terminal assembly 13 includes a microprocessor controlled, i.e. intelligent, data entry/video display terminal having ports P, and $P_2$, a split baud rate modem 19 having ports $P_4$, $P_5$ and $P_6$ and a telephone instrument 21 having a port $P_3$. Port $P_2$ in intelligent display terminal 17 is coupled to port $P_4$ in modem 19 through a line 23 and port $P_3$ in telephone instrument 21 is coupled to port $P_5$ in modem 19 through a line 25. Port $P_1$ in intelligent display terminal 17 is intended to be coupled to a computer such as a NOVA 3 computer made and sold by Data General Corporation of Westboro, Massachusetts, (not shown), through an asynchronous line 27 and port $P_6$ in modem 19 is connected through suitable plugs and jacks (not shown) to a two wire telephone line 29.

Support-site diagnostic display terminal assembly 15 includes an intelligent display terminal 31 which may be identical in construction to intelligent display terminal 17, a split baud rate modem 33, which as will be hereinafter explained, is different from but compatable with modem 19 and a telephone instrument 35 which may be identical in construction to telephone instrument 21. Intelligent display terminal 31 includes a port $P_7$ and telephone instrument 35 includes a port $P_5$ which are coupled to ports $P_9$ and $P_{10}$, respectively, in modem 33 through lines 37 and 39, respectively. Modem 33 also includes a port $P_{11}$ which is coupled through suitable plugs and jacks (not shown) to telephone line 29.

Intelligent display terminals 17 and 31 are of any known type such as Model No. 6093 made and sold by Data General Corporation of Westboro, Massachusetts. The Model No. 6093 intelligent display terminal includes a keyboard which functions as the data input device and is connected to the remainder of the terminal through a cable, a video monitor which provides the operator with visual communication, a processor board which includes a micro, CPU, a RAM/ROM memory, a device code generator, a keyboard interface, a printer interface and a host CPU interface, a video board which functions to store and display characters on the video monitor and a power supply.

Telephone instruments 21 and 25 may be either dial or touch-tone type and are preferably headset as opposed to handset type instruments to permit the operator to use both hands to operate the keyboard while communicating verbally.

Modems 19 and 33 are split baud rate modems designed to operate as a pair to maximize remote diagnosing of malfunctions and when used together form a full duplex modem. Thus modem 19 includes a synchronous high baud rate transmitter and an asynchronous low baud receiver while modem 33 includes a compatible asynchronous low baud transmitter and a synchronous high baud rate receiver. Modems 19 and 33 may be modems of the type manufactured and sold by Intertel Inc. of Burlington, Massachusetts, under the model numbers M2415 and M1524, respectively. Modem M2415 includes a 2400 baud transmitter and a 0–150 baud receiver while modem M1504 includes a 0–150 baud transmitter and a 2400 receiver.

Modems 19 and 33 may be physcially located either internal or external to their respective intelligent display terminals. If located external to their respective intelligent terminals, the modems also include power supplies (not shown). When using a Data General Model No. 6093 display terminal for intelligent terminal 17 and an Intertel Model M2415 for modem 19, the modem is preferably mounted internal to the display terminal. When using a Data General Model No. 6093 display terminal for intelligent terminal 31 and an Intertel Model M1524 for modem 33, the modem is preferably external to the display terminal and thus includes a power supply to provide the necessary operating voltages. Each one of the above defined modems includes the required protective circuitry to allow direct connection to a two wire telephone line through a data jack. Each modem is designed to operate in either a voice mode and a data mode.

The voice mode allows the user-site and the support-site to converse in a normal manner and the data mode allows the modems to transmit and receive data at rates as set forth above.

When in use, the system provides an almost simultaneous voice and data communication link.

The method of using system 11 when constructed to include two Data General Model No. 6093 display terminal one for intelligent terminal 17 and the other for intelligent terminal 31, an Intertel Modem No. M2415 for modem 19 and an Intertel Modem No. 1524 for modem 33 is as follows.

In the absence of a request to send (RTS) on condition or receive data, which is instituted by pressing a key on the keyboard, the modems 19 and 33 are in a voice mode. This is indicated by the absence of a continuous tone audible in the telephone instrument. To initiate a call, a party at either end picks up or otherwise activates the telephone instrument and dials the appropriate number. The telephone assigned to that number will ring to acknowledge the incoming call. When the telephone is answered, the link is established and both parties may converse in a normal manner. When either RTS is acknowledged as ON, or receive carrier is detected, the modems automatically switch to the data mode. Transitions from voice to data and data to voice are suppressed in the telephone receiver. Data mode is indicated by supplying an audible continuous tone to the telephone receiver. The link is cut by either party hanging up the telephone.

What is claimed is:

1. A display terminal system comprising:
   (a) a user-site display terminal assembly, said user-site display terminal assembly including:
      (i) a microprocessor controlled display terminal, said display terminal having an alpha-numeric keyboard, a micro CPU, a video monitor, a first port for connecting said display terminal to a computer and a second port,
      (ii) a telephone instrument, and
      (iii) a modem coupled to said second port of said display terminal and said telephone instrument for interfacing said display terminal and said telephone instrument to a telephone line, and
   (b) a support-site display terminal assembly, said support-site display terminal assembly including:
      (i) a microprocessor controlled display terminal having an alpha-numeric keyboard, a port, a micro CPU, and a video monitor,
      (ii) a telephone instrument, and (iii) a modem coupled to said display terminal through said port and said telephone instrument for interfacing said microprocessor controlled display terminal and said telephone instrument to said same telephone line, (c) said modems being split baud rate modems and being constructed so as to enable switching between voice and data modes of operation and such that inputs entered by either display terminal appear on both display terminals when a telephone link is established between said terminal assemblies over said telephone line, said modem in said user-site dislay terminal assembly including a 2400 baud transmitter and a 0-150 baud receiver and said modem in said support-site display terminal assembly including a 0-150 baud transmitter and a 2400 baud receiver.

* * * * *